United States Patent [19]
Benz et al.

[11] Patent Number: 5,484,034
[45] Date of Patent: Jan. 16, 1996

[54] MOTOR VEHICLE AND PROCESS FOR PRODUCTION THEREOF

[75] Inventors: Erwin Benz, Gechingen; Gerhard Burk, Sindelfingen; Norbert Schwuchow; Werner Trost; Martin Deibler, Esslingen, all of Germany

[73] Assignee: Mercedes-Benz AG, Germany

[21] Appl. No.: 364,199

[22] Filed: Dec. 27, 1994

[30] Foreign Application Priority Data

Dec. 24, 1993 [DE] Germany .......................... 43 44 581.0

[51] Int. Cl.⁶ .......................... B62D 25/08; B62D 21/00
[52] U.S. Cl. .......................... 180/312; 180/294; 280/790
[58] Field of Search .......................... 180/291, 292, 180/299, 311, 312; 280/783, 790, 781

[56] References Cited

U.S. PATENT DOCUMENTS

| | | | |
|---|---|---|---|
| 2,759,740 | 8/1956 | McFarland | 180/312 |
| 2,997,122 | 8/1961 | Frey et al. | 180/312 |
| 4,093,254 | 6/1978 | Ezaki | 280/783 |
| 4,263,980 | 4/1981 | Harlow, Jr. et al. | 180/292 |
| 4,453,740 | 6/1984 | von der Ohe et al. | 280/781 |
| 4,753,315 | 6/1988 | Fujisaki et al. | 180/299 |

FOREIGN PATENT DOCUMENTS

| | | |
|---|---|---|
| 0063372A1 | 10/1982 | European Pat. Off. . |
| 0378260 | 7/1990 | European Pat. Off. . |
| 3820644A1 | 12/1989 | Germany . |
| 4008896A1 | 9/1990 | Germany . |
| 4341355A1 | 6/1994 | Germany . |
| 64-47640 | 2/1989 | Japan . |
| 38545 | 2/1936 | Netherlands . |

*Primary Examiner*—Kenneth R. Rice
*Attorney, Agent, or Firm*—Evenson, McKeown, Edwards & Lenahan

[57] ABSTRACT

A motor vehicle has a supporting frame with a bearer part which is arranged thereon and on which, in turn, additional units together with their connecting lines are pre-assembled. To simplify assembly or repair, the frame has, in the region of the wheel housing, a perforation. In the region of the perforation, the bearer part is assembled. After the mounting of the bearer part equipped with the additional units and the connection or laying of the connecting lines, the perforation is subsequently closed. That is, after the painting of the frame, the perforation is closed by a cover plate which can be attached on the outside.

17 Claims, 3 Drawing Sheets

MOTOR VEHICLE AND PROCESS FOR PRODUCTION THEREOF

BACKGROUND AND SUMMARY OF THE INVENTION

The present invention relates to a motor vehicle with a bearer part arranged in the engine compartment and fastenable at least indirectly to supporting structural parts of the vehicle front and to a process for the production of such a motor vehicle.

EP 378,260 A1 describes a bearer part, on which various additional units can be pre-assembled outside the frame in order to reduce the outlay involved in installation of additional units during assembly and in the event of repairs. After the pre-assembly of the additional units, this bearer part is arranged on the body after the body has been completed. The arrangement of the bearer part on the body takes place particularly by interlocking. Subsequently, the cabling of the additional units is laid and is connected appropriately. However, on account of the large number of additional units installed in current motor vehicles, the laying of the cabling is time-consuming and therefore cost-intensive, particularly where repairs are concerned.

DE 4,008,896 A1 describes a front part of a motor-vehicle body in the region of the wheel case, in which, in order to strengthen the body rigidity, the front part has an inner supporting frame which mainly contributes to the rigidity of the body and which possesses an additional strut in the region of the wheelcase. The outer termination of this frame is formed by the panel of the wheel case which covers the frame relative to the outside in the manner of a cover plate. When the crude body is produced in this way, it is painted; subsequently, the engine and, depending on the equipment, various additional units are mounted on the inside of the frame. This outlay is relatively high, however, because different additional units are installed, depending on the equipment of the vehicle to be assembled. These necessitate a high outlay in the laying of, for example, the electrical and/or pneumatic connections of the additional units, hereafter referred to as cabling. In addition, there is always at the same time also a latent risk of confusion which makes costly extra work necessary. Furthermore, in the event of a repair, the outlay caused by the often compact laying of the cabling of the various additional units is very high.

An object of the invention is to provide a motor vehicle and a process for the production thereof such that, even in the case of a freely selectable type diversity and different equipment which can be installed directly on an assembly line, the entire assembly as well as demounting and repair with additional units, engine, etc. can be carried out cost-effectively.

The foregoing object has been achieved by a motor vehicle in which the supporting structural parts are formed by a supporting frame having at least one perforation, such that the bearer part is fastened in a region of a vehicle wheel housing. The at least one perforation is arranged so as to be closed subsequently after the mounting of the bearer part equipped with the additional units and the connecting lines, by way of a cover plate attachable on the outside thereof. The object is also achieved by a process in which producing a frame construction or a supporting frame, having at least one perforation in a region of the wheel housing as a supporting structure of the motor vehicle; the supporting frame is painted; the bearer part is fastened in a region of the perforation, the connecting lines are laid; and the perforation is closed with a cover plate.

With regard to a motor vehicle produced by the process according to the present invention, assembly and cabling of the additional units can be carried out both from inside and from outside the shell of the body, thus entailing a simpler and quicker assembly, demounting and repair. Furthermore, the hitherto necessary and confusing Laying of the cabling around the additional units and other built-on parts can to some extent be disentangled, since it now also becomes possible to bring the cabling between the supporting frame and the cover plate forming the shell of the body. That is, the laying of the cabling can now take place in at least two planes, without the need for any additional structures or holding brackets influencing the cable run and to be additionally mounted, with the result that the aesthetic of the engine compartment are also improved. Moreover, the bearer part effectively reduces a risk of confusion of additional units which has hitherto existed on account of the diversity of the equipment of motor vehicles assembled on a line and which entails cost-intensive extra work.

Furthermore, it has, at the same time, proved beneficial that the functions of the additional units on the equipped bearer parts can be tested before installation in the manner of modules and, in the event of a repair, can also be exchanged as a complete item, with the result that, for example, the work time and therefore, inter alia, the repair costs are reduced.

Because the cover plate does not perform a supporting function or now only to a slight extent, it can be produced from a rust-resistant and/or light material, such as plastic, or possibly also from recycled materials and can be fastened to the frame in a simple and releasable manner.

Advantageously, the bearer part can be configured so that the risk which, in the event of an accident, stems from a displacements of the additional units mounted on the bearer part is reduced in a-simple way. The reduction of this risk is possible, for example, in that the bearer frame is fastened to the supporting frame so that, in the event of an accident, it can shift upwards, with the result that none of the additional-units arranged thereon can penetrate into the passenger compartment.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
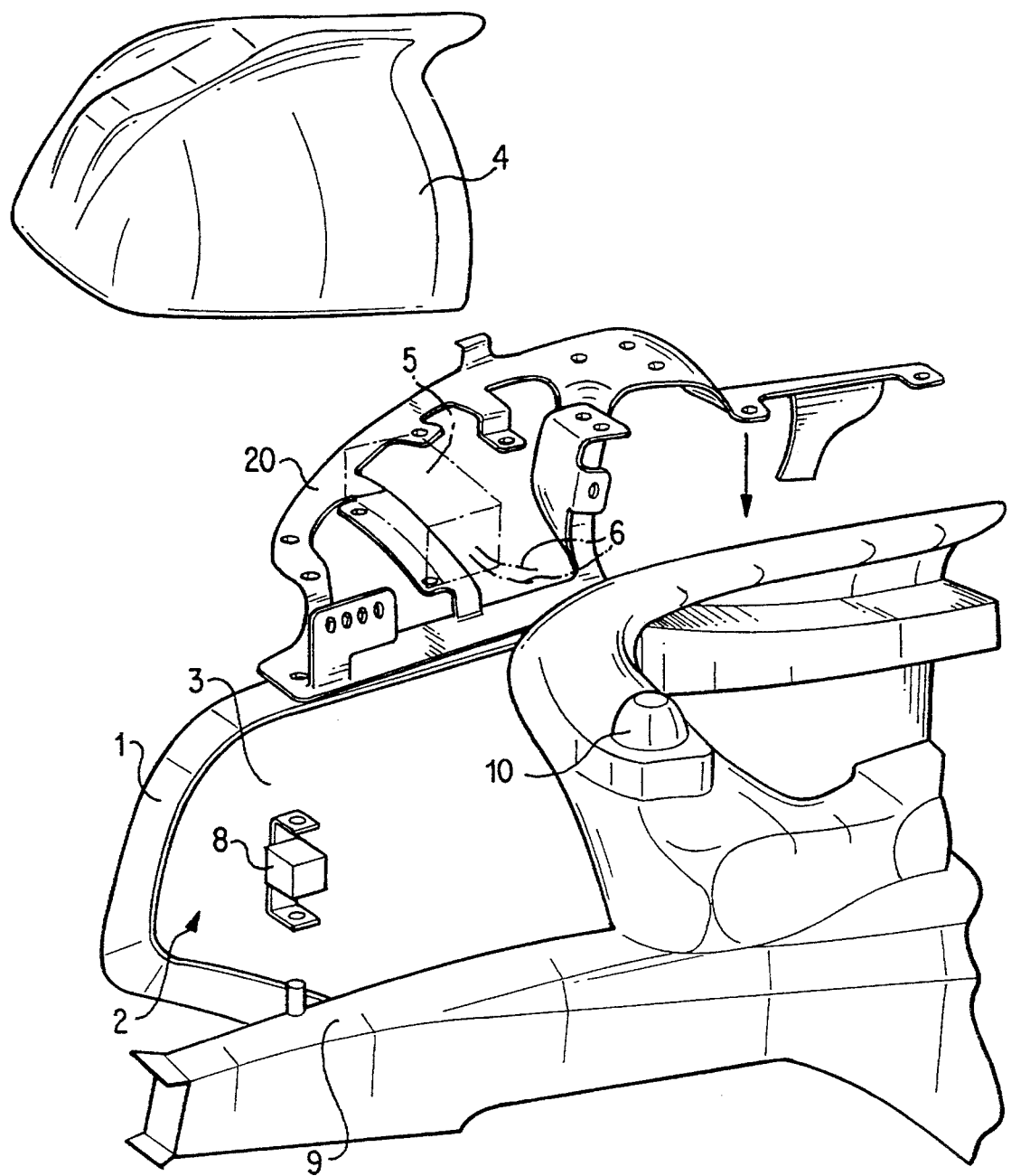
FIG. 1 is an exploded perspective view of a front right-hand wheel housing with a lattice-like bearer part to be mounted and having an oscillation damper, and with a cover plate forming the wheel case of the wheel housing.

FIG. 1 shows an exploded view of a front right-hand wheel housing 2 of a motor vehicle, with a skeleton-like and/or lattice-like bearer part 20 to be mounted and with a cover plate 4 forming the wheel case of the wheel housing 2. The motor vehicle has, in the region of the wheel housing 2, a skeleton-like supporting frame 1 which is provided with a perforation 3 inside of which can be fastened to the bearer part 20 which is also fastened outside the cover plate 4.

Figure 2:
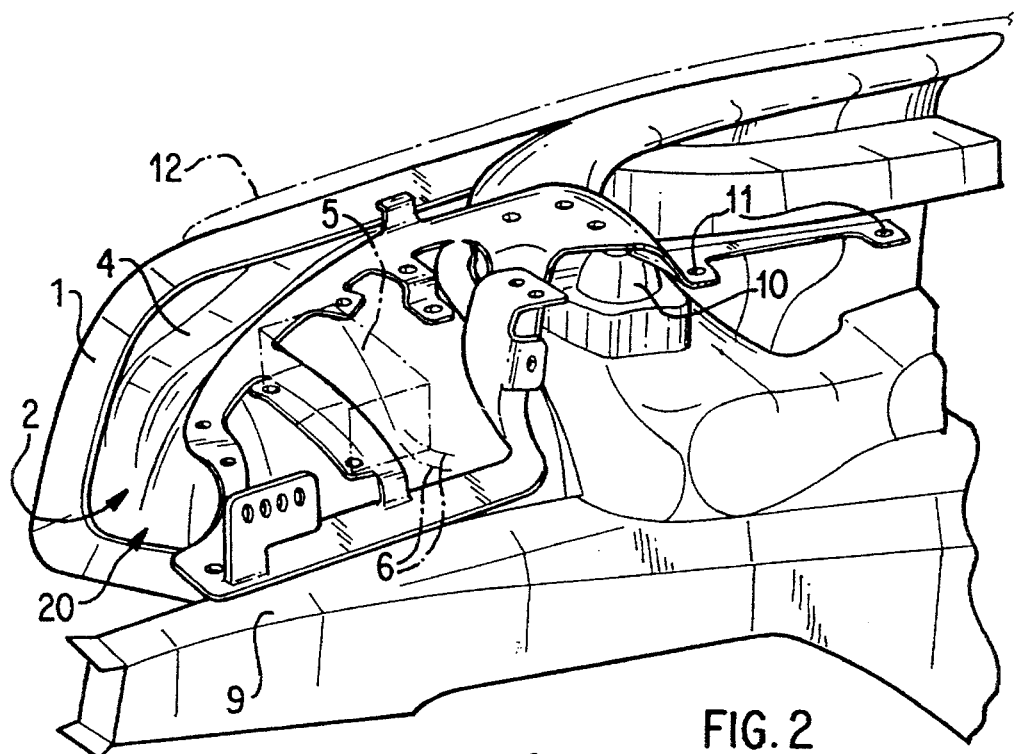
FIG. 2 is a perspective view of the parts according to FIG. 1 mounted on the supporting frame, without the oscillation damper.

The assembly of the parts shown in the exploded drawing is illustrated in FIG. 2. The three-dimensional shape of the lattice-like bearer part 20 reproduces approximately the inner enveloping surface covering the supporting frame 1. Various additional units 5, such as, for example, an ignition coil, a diagnostic box, a compensator reservoir, etc., together with their connecting lines 6 (shown in dot-dash lines), are pre-assembled on the bearer part 20. For the pre-assembly of the additional units 5, the bearer part 20 has fastening points 11, such as threaded bores, catch-behind perforations for interlocks or the like, at which the additional units 5, especially together with their connecting lines 6, are firmly screwed.

After the vehicle has been painted, the bearer part 20 equipped with the additional units 5 is inserted into the engine compartment of the motor vehicle and is firmly screwed by the screws arranged on the supporting frame 1. The fastening points 11 oil the bearer part 20 are preferably arranged on the front side member 9 of the vehicle frame 1 and on the upper longitudinal portion of the frame 1, particularly on the spring dome 10 of the wheel suspension. The bearer part 20 can advantageously be configured such that, in addition to receiving the additional units 5, it also has a supporting and bearing function.

The still loose connecting lines 6 are subsequently laid, and they can run along the bearer part 20 between the bearer part 20 and the supporting frame 1 and/or on the outside of the supporting frame 1. The laying of the connecting lines 6 is greatly simplified, because: it is possible for a worker, but also for a robot to gain access both on the inside and, through the perforation 3 in the region of the wheel housing 2, on the outside, inasmuch as the cover plate 4 forming the wheel case is attached to the frame 1 only after the connecting lines 6 have been laid.

In one presently contemplated embodiment, the connecting lines 6 of the additional units 5 can also be arranged directly on the bearer part 20, with the result that the connection of the connecting lines 6 can take place during the fastening of the bearer part 20 to the supporting frame 1. Due to the greater accessibility, the laying of the supply or discharge lines leading to the connections on the vehicle side is further simplified thereby.

Advantageously, during the fastening of the bearer part 20, an oscillation damper 8 is arranged between the frame 1 and the bearer part 20 and at least reduces the oscillations of the additional units 5 arranged on the bearer part 20. This is especially advantageous because, as a result, now only the excitation to oscillate of the entire bearer part 20 together with assembled additional units 5 has to be taken into account, and not each excitation to oscillate of each individual additional unit 5 in itself. Furthermore, the number of oscillation-attenuating or oscillation-damping components required for oscillation damping is reduced, thereby entailing a simplification of assembly and demounting and a cost reduction.

Figure 3:
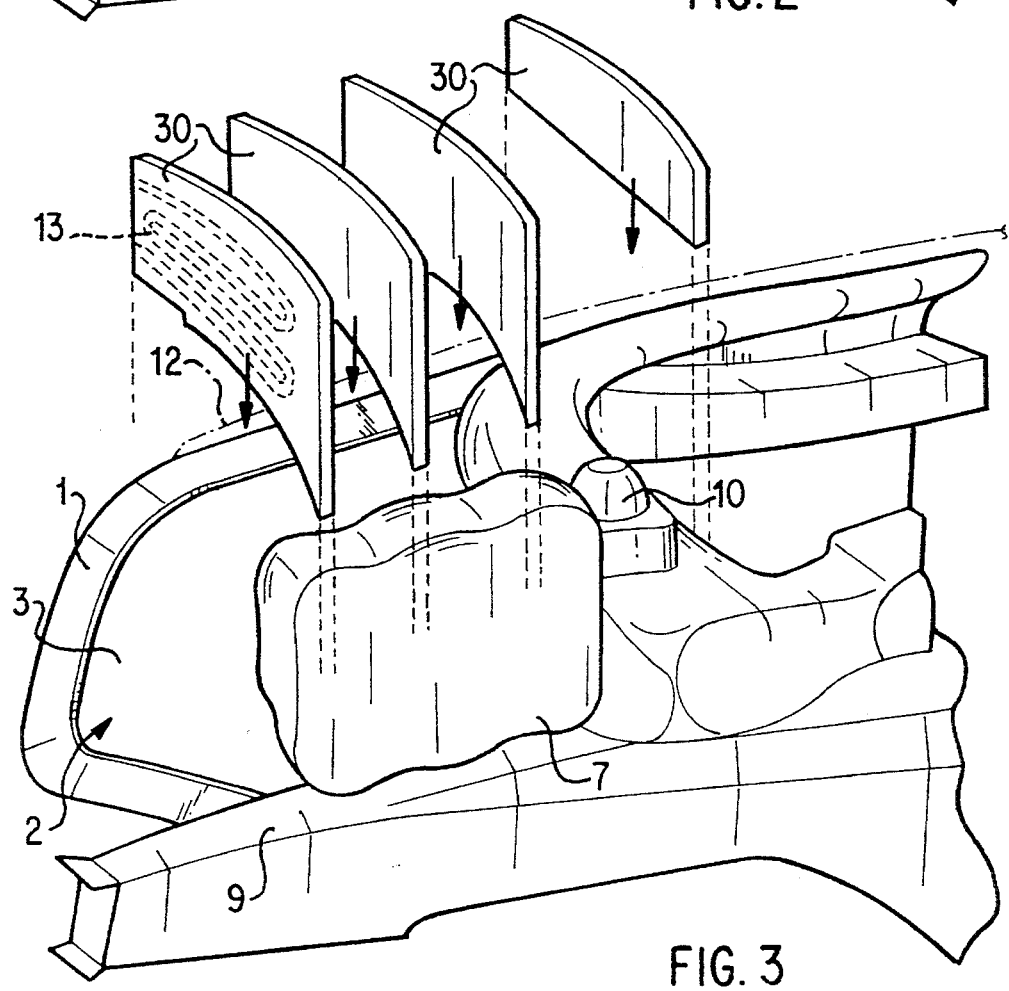
FIG. 3 is an exploded perspective view of a plurality of plate-like bearer parts mounted parallel to one another in the region of the front right-hand wheel housing on an intermediate part arranged on the supporting frame.

FIG. 3 shows a plurality of bearer parts 30 which are mounted parallel to one another on the front right-hand wheel housing 2 and which, in contrast to the bearer part 20 of the embodiment according to FIGS. 1 and 2, are of plate-like design. As a result of this configuration of the bearer part 30, the latter can be arranged parallel and transversely to the enveloping curve of the frame 1, that is to say so as to project from the frame 1.

It has proved beneficial, at the same time, to incline these bearer parts 30 relative to the vertical axis parallel to the z-axis, since, in the event of an accident, the bearer parts 30 are thereby prevented from forming a block by virtue of an oblique slate-like sliding on one another of the bearer parts 30 equipped with the additional units 5. From the viewpoint of accident safety, it is likewise expedient, with the engine hood 12 (shown in dot-dash lines) closed, to fasten the bearer parts 30 to the engine hood 12 especially by interlocking and/or engaging behind and/or latching, and to fasten them, on the frame side, such that they can be released from their anchoring beyond a specific tensile force acting on the fastening. As a result, the bearer parts 30 can be pulled out through the engine hood 12 which, in the event of an accident, is angled upwards, with the result that more space remains for energy absorption.

With regard to electrical additional units 5, which heat up during operation, it is expedient to provide the bearer part 30 with heat-dissipating measures, such as cooling ribs or cooling ducts 13 which result in the cooling of these additional units 5. It is beneficial, here, that all such additional units 5 of a bearer part 30 can be taken into account simultaneously.

Furthermore, each bearer part 30 can be equipped with additional units 5 of a predeterminable configuration which are arranged especially on both sides. As a result, depending on the design version of the vehicle, specific bearer parts 30 can be dispensed with or specific additional units can be installed. In order to avoid the risk of confusion, it is expedient to configure the fastening points 11 for the various bearer parts 30 differently from one another, so that a bearer part 30 can be arranged only at the specific location provided therefor.

Figure 4:
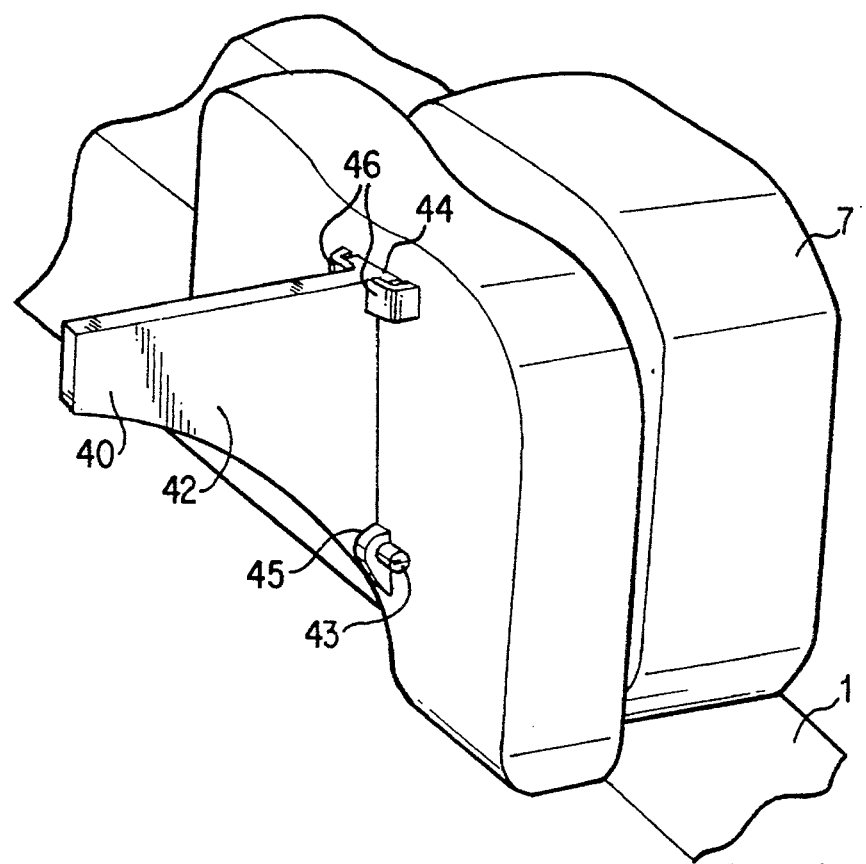
FIG. 4 is a perspective view of a compensator reservoir arranged on the supporting frame and having a bearer part arranged thereon.

FIG. 4 shows a view of an intermediate part 7 arranged on the supporting frame 1 and having a bearer part 40 arranged thereon. The bearer part 40 is configured as a largely plane plate-like plug board, on which the additional units 5 can be plugged, i.e. interlocked. The bearer part 40 itself is arranged on an intermediate part 7 formed advantageously by a compensator reservoir.

The bearer part 40 projects from the compensator reservoir which is itself fixed to the supporting frame 1 by screwing, interlocking or the like. The bearer part 40 extends transversely relative to the frame 1 and perpendicularly from the surface of that side of the intermediate part 7 on which the bearer part 40 is fastened on one of its narrow sides.

Figure 4A:
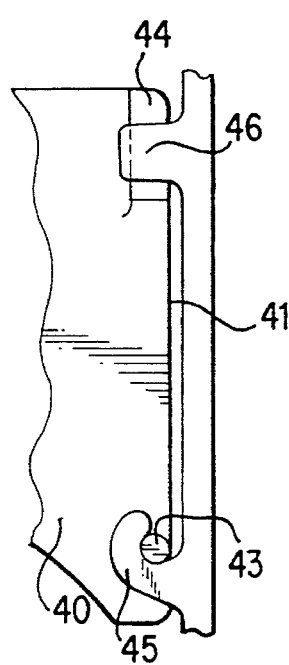
FIG. 4a is an elevational view in the x-direction of the fastening of the bearer part to the compensator reservoir according to FIG. 4.
Figure 4B:
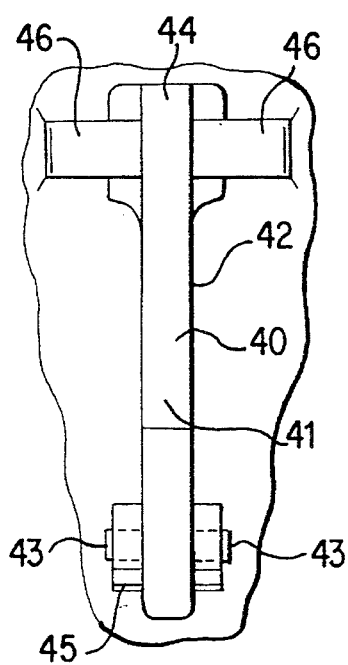
FIG. 4b is an elevational view in the y-direction of the fastening of the bearer part to the compensator reservoir according to FIG. 4.
Figure 4C:
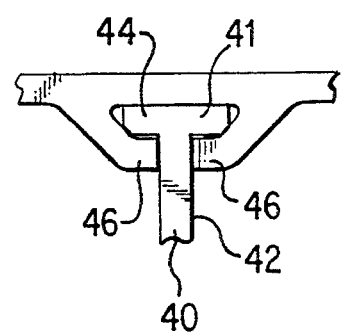
FIG. 4c is a plan view in the z-direction of the fastening of the bearer part to the compensator reservoir according to FIG. 4.

One embodiment of a simple fastening of the plate-like bearer part 40 to the compensator reservoir used as an intermediate part 7 is shown in FIGS. 4a to 4c in views from different directions. Of these, FIG. 4a shows the view in the x-direction, FIG. 4b shows the view in the y-direction, and FIG. 4c shows the view in the z-direction.

For fastening, the bearer part 40 has, on the lower region, with respect to the vehicle, of its narrow side 41 facing the intermediate part 7, a bolt 43 projecting on both sides transversely relative to its flat sides 42 and, on the upper region of the narrow side 41, a collar 44 projecting on both sides and formed by flat pieces.

The bolt 43 is assigned, on the same side as the intermediate part, to a lug 45 which is open upwards and the orifice width of which is smaller than the diameter of the bolt 43. The lug 45 has in the vertical or "Z" direction, corresponding to the direction of insertion of the bearer part 40, a groove whose clear width is larger than or equal to the width of the narrow side 41, so that the bolt 43 is interlocked in the lug 45 and the bearer part 40 is held on this lower region. Furthermore, the intermediate part 7 has a guide groove which, with the bearer part 40 inserted completely, surrounds the collar 44 and is formed by two holding fingers 46 oriented parallel to the surface of the compensator reservoir and into which the collar 44 of the bearer part 40 is pushed.

By way of the collar 44, the associated holding fingers 46 and the bolt 43 together with the associated lug 45, the bearer part 40 has, in addition to the mounting in the x-y plane, at the same time a mounting relative to a pivot axis oriented parallel to the z-axis.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle, comprising a bearer part arranged in an engine compartment and fastenable at least indirectly to supporting structural parts of a front part of the vehicle, and pre-assemblable additional units having connecting lines laid within the engine compartment, wherein the supporting structural parts are formed by a supporting frame having at least one perforation, such that the bearer part is fastened in a region of a vehicle wheel housing, the at least one perforation is arranged so as to be closed subsequently after the mounting of the bearer part equipped with the additional units and the connecting lines, by way of a cover plate attachable on the outside thereof.

2. The motor vehicle according to claim 1, wherein the associated connecting line of an additional unit is at least partially between the bearer part and the cover plate.

3. The motor vehicle according to claim 1, wherein the bearer part is arranged on the supporting frame via an intermediate part.

4. The motor vehicle according to claim 1, wherein at least one oscillation-attenuating element is arranged between the bearer part and the supporting frame.

5. The motor vehicle according to claim 1, wherein the bearer part has at least one of cooling ribs and cooling ducts for the dissipation of heat from the additional units.

6. The motor vehicle according to claim 1, wherein the bearer part is arranged on a front side member of a vehicle body and on an upper longitudinal portion of the frame, in a region of a wheel suspension spring dome.

7. The motor vehicle according to claim 1, wherein the bearer part is configured and installed so as to have a supporting and stabilizing function.

8. The motor vehicle according to claim 1, wherein the bearer part is lattice-shaped to reproduce an inner contour of the supporting frame and has fastening points for pre-assembly of the additional units.

9. The motor vehicle according to claim 1, wherein the bearer part is a substantially planar plug board on which the additional units are snap pluggable and is arranged transversely relative to the supporting frame to project therefrom.

10. The motor vehicle according to claim 1, wherein a plurality of bearer parts are arranged so as to project from the supporting frame and parallel to one another in the region of the wheel housing.

11. The motor vehicle according to claim 9, wherein the bearer part has additional units arranged on both sides thereof.

12. The motor vehicle according to claim 9, wherein, with the engine hood closed, the bearer part is connected to the engine hood.

13. The motor vehicle according to claim 1, wherein the bearer part is at least one of interlocked, caught behind and latched with the engine hood.

14. A process for production of a motor vehicle having a bearer part arranged in an engine compartment and fastenable at least indirectly to supporting structural parts of a front part of the motor vehicle, and pre-assemblable additional units with connecting lines installed in the engine compartment, comprising the steps of (a) producing a frame construction or a supporting frame, having at least one perforation in a region of the wheel housing as a supporting structure of the motor vehicle;

(b) painting the supporting frame;

(c) fastening the bearer part in a region of the perforation, and laying or connecting the connecting lines; and (d) closing the perforation with a cover plate.

15. The process according to claim 14, wherein the connecting line of an additional unit is laid, at least partially, between the supporting frame and the cover plate.

16. The process according to claim 14, wherein the connecting line of an additional unit is laid between the bearer part and the cover plate.

17. The process according to claim 14, wherein the connecting line of an additional unit is laid between the supporting frame and the bearer part.

* * * * *